(12) United States Patent
Hiraki et al.

(10) Patent No.: US 8,883,352 B2
(45) Date of Patent: Nov. 11, 2014

(54) SURFACE MODIFIED LITHIUM-CONTAINING COMPOSITE OXIDE FOR CATHODE ACTIVE MATERIAL FOR LITHIUM ION SECONDARY BATTERY AND ITS PRODUCTION PROCESS

(75) Inventors: Remi Hiraki, Chigasaki (JP); Takeshi Kawasato, Chigasaki (JP)

(73) Assignee: AGC Seimi Chemical Co., Ltd., Chigasaki-shi (JP)

( * ) Notice: Subject to any disclaimer, the term of this patent is extended or adjusted under 35 U.S.C. 154(b) by 100 days.

(21) Appl. No.: 13/196,950

(22) Filed: Aug. 3, 2011

(65) Prior Publication Data
US 2011/0287321 A1 Nov. 24, 2011

Related U.S. Application Data

(63) Continuation of application No. PCT/JP2010/051431, filed on Feb. 2, 2010.

(30) Foreign Application Priority Data

Feb. 5, 2009 (JP) ................. 2009-025405

(51) Int. Cl.
*H01M 4/131* (2010.01)
*B05D 5/12* (2006.01)
(Continued)

(52) U.S. Cl.
CPC ... *C04B 35/62821* (2013.01); *C04B 2235/3203* (2013.01); *C04B 2235/5409* (2013.01);
(Continued)

(58) Field of Classification Search
CPC ..... H01M 4/366; H01M 4/485; H01M 4/505; H01M 4/585; H01M 10/052

USPC .............. 429/231.95, 223, 224, 231.3, 231.5; 427/126.6, 126.4; 252/182.1
See application file for complete search history.

(56) References Cited

U.S. PATENT DOCUMENTS 6,458,487 B1 * 10/2002 Takeuchi et al. .............. 429/224
7,709,148 B2 5/2010 Kawasato et al.
(Continued)

FOREIGN PATENT DOCUMENTS

CN 1399364 A 2/2003
CN 101151747 A 3/2008
(Continued)

OTHER PUBLICATIONS

International Search Report issued Apr. 20, 2010 in PCT/JP2010/051431, filed Feb. 2, 2010.

(Continued)

*Primary Examiner* — Edu E Enin-Okut
(74) *Attorney, Agent, or Firm* — Oblon, Spivak, McClelland, Maier & Neustadt, L.L.P.

(57) ABSTRACT

To provide a surface modified lithium-containing composite oxide having excellent discharge capacity, volume capacity density, safety, durability for charge and discharge cycles, and high rate property.
A surface modified lithium-containing composite oxide, comprising particles of a lithium-containing composite oxide having a predetermined composition and a lithium titanium composite oxide containing lithium, titanium and element Q (wherein Q is at least one element selected from the group consisting of B, Al, Sc, Y and In) contained in the surface layer of the particles, wherein the lithium titanium composite oxide is contained in the surface layer of the particles in a proportion of the total amount of titanium and element Q in the lithium titanium composite oxide contained in the surface layer to the lithium-containing composite oxide particles is from 0.01 to 2 mol %, and the lithium titanium composite oxide has a peak at a diffraction angle 2θ within a range of 43.8±0.5° in powder X-ray diffraction measurement in which CuKα rays are used.

19 Claims, 1 Drawing Sheet

(51) Int. Cl.
*H01M 4/42* (2006.01)
*H01M 4/46* (2006.01)
*H01M 4/485* (2010.01)
*H01M 4/505* (2010.01)
*H01M 4/525* (2010.01)
*H01M 10/0525* (2010.01)
*C04B 35/628* (2006.01)
*C01G 53/00* (2006.01)
*C04B 35/01* (2006.01)
*H01M 4/36* (2006.01)
*H01M 10/052* (2010.01)
*C01G 51/00* (2006.01)

(52) U.S. Cl.
CPC ..... *C04B 2235/5436* (2013.01); *C01P 2006/40* (2013.01); *C04B 35/62886* (2013.01); *C01G 53/42* (2013.01); *C01P 2006/11* (2013.01); *H01M 4/505* (2013.01); *C01P 2006/12* (2013.01); *C04B 35/01* (2013.01); *H01M 4/366* (2013.01); *C01P 2004/51* (2013.01); *C04B 2235/3275* (2013.01); *C04B 2235/3206* (2013.01); *C04B 2235/5481* (2013.01); *H01M 4/525* (2013.01); *C01P 2002/72* (2013.01); *C04B 2235/3244* (2013.01); *C04B 2235/442* (2013.01); *C01P 2004/80* (2013.01); *Y02E 60/122* (2013.01); *C01P 2002/76* (2013.01); *C04B 2235/449* (2013.01); *C01P 2002/52* (2013.01); *H01M 10/052* (2013.01); *C04B 2235/768* (2013.01); *C01G 51/42* (2013.01); *C04B 2235/762* (2013.01); *C04B 2235/3217* (2013.01); *C01P 2004/84* (2013.01)
USPC ...... 429/231.95; 429/223; 429/234; 429/229; 429/231.3; 429/231.5; 427/126.6; 427/126.4; 252/182.1

(56) References Cited

U.S. PATENT DOCUMENTS

| | | | |
|---|---|---|---|
| 7,842,268 | B2 | 11/2010 | Kawasato et al. |
| 7,879,265 | B2 | 2/2011 | Endo et al. |
| 8,021,785 | B2 | 9/2011 | Wakasugi et al. |
| 2002/0018746 | A1* | 2/2002 | Gao et al. ............ 423/593 |
| 2002/0076613 | A1 | 6/2002 | Lee et al. |
| 2004/0201948 | A1* | 10/2004 | Hosoya et al. ........ 361/305 |
| 2004/0258836 | A1 | 12/2004 | Besenhard et al. |
| 2004/0265693 | A1* | 12/2004 | Kurachi ............. 429/231.1 |
| 2008/0131780 | A1 | 6/2008 | Kawasato et al. |
| 2008/0160414 | A1 | 7/2008 | Jitsugiri et al. |
| 2009/0127503 | A1 | 5/2009 | Endo et al. |
| 2010/0173199 | A1 | 7/2010 | Hiraki et al. |
| 2011/0033749 | A1 | 2/2011 | Uchida et al. |

FOREIGN PATENT DOCUMENTS

| | | |
|---|---|---|
| EP | 1 136 446 A2 | 9/2001 |
| JP | 2000-200605 | 7/2000 |
| JP | 2002-151078 | 5/2002 |
| JP | 2002-231227 | 8/2002 |
| JP | 2003-007299 | 1/2003 |
| JP | 2008-103204 | 5/2008 |
| WO | 99/05734 | 2/1999 |
| WO | 2007/052712 | 5/2007 |

OTHER PUBLICATIONS

Supplementary European Search Report dated Dec. 14, 2012, issued in EP patent application No. 10 73 8517 filed Feb. 2, 2010.
Chinese Office Action issued Apr. 19, 2013, in China Patent Application No. 201080003507.2.
Notification of Reason(s) for Refusal issued Dec. 10, 2013 in Japanese Patent Application No. 2010-549473 (with English translation).

* cited by examiner

SURFACE MODIFIED LITHIUM-CONTAINING COMPOSITE OXIDE FOR CATHODE ACTIVE MATERIAL FOR LITHIUM ION SECONDARY BATTERY AND ITS PRODUCTION PROCESS

TECHNICAL FIELD

The present invention relates to a surface modified lithium-containing composite oxide suitable for a cathode active material of a lithium ion secondary battery, a process for producing the surface modified lithium-containing composite oxide, a positive electrode containing the surface modified lithium-containing composite oxide, and a lithium ion secondary battery.

BACKGROUND ART

Recently, as the portability and codeless tendency of instrument have progressed, a demand for a non-aqueous electrolyte secondary battery such as a lithium ion secondary battery which is small in size and light in weight and has a high energy density, has been increasingly high. As a cathode active material for the non-aqueous electrolyte secondary battery, a composite oxide of lithium and a transition metal or the like (which may be referred to as a "lithium-containing composite oxide") such as $LiCoO_2$, $LiNi_{1/3}Co_{1/3}Mn_{1/3}O_2$, $LiNiO_2$, $LiNi_{0.8}Co_{0.2}O_2$, $LiMn_2O_4$ or $LiMnO_2$, has been known.

Particularly, a lithium secondary battery using $LiCoO_2$ as a cathode active material and using a lithium alloy or carbon such as graphite or carbon fiber as a negative electrode, can obtain a high voltage at a level of 4 V, whereby it has been widely used as a battery having a high energy density.

However, in the case of the non-aqueous type secondary battery using $LiCoO_2$ as a cathode active material, further improvement has been desired e.g. in the discharge capacity, in the stability against heat during heating (which may be referred to as a "safety" in the present invention) and in the capacity density per unit volume of the positive electrode layer (which may be referred to as a "volume capacity density" in the present invention), and it had a problem of e.g. deterioration in the durability for charge and discharge cycles such as a gradual decrease in the discharge capacity of the battery by carrying out charge and discharge cycles repeatedly.

In order to solve these problems, various studies have been made. For example, it has been proposed to prepare lithium cobalt oxide having titanium oxide or lithium titanium composite oxide attached to the particle surface, by mixing preliminarily prepared lithium cobalt oxide with titanium oxide or lithium titanium composite oxide and firing the mixture (Patent Document 1).

Further, it has been proposed to prepare lithium cobalt oxide, by adding lithium hydroxide and titanium tetrachloride to a solution having preliminarily prepared lithium cobalt oxide dispersed, followed by heat treatment, so that a lithium titanium composite oxide be present on the particle surface (Patent Document 2).

Further, it has been proposed to prepare a lithium/manganese-containing composite oxide by adding lithium nitrate and a nitrate of a metal to a suspension having a lithium/manganese-containing composite oxide represented by $Li_{1.1}Mn_{1.9}O_4$ dispersed, followed by stirring, dehydration and firing, so that the particle surface be covered with $LiAlTiO_4$ having a spinel structure (Patent Document 3).

PRIOR ART DOCUMENTS

Patent Documents

Patent Document 1: JP-A-2000-200605
Patent Document 2: JP-A-2002-151078
Patent Document 3: WO1999/005734

DISCLOSURE OF INVENTION

Technical Problem

Despite the above-described various studies, a lithium-containing composite oxide satisfying all of various characteristics such as the discharge capacity, the safety, the volume capacity density and the durability for charge and discharge cycles has not yet been obtained.

For example, lithium cobalt oxide having titanium oxide or a lithium titanium composite oxide attached to the particle surface is obtained by mixing a powder of lithium cobalt oxide with a powder of a lithium titanium composite oxide, and the particle surface of lithium cobalt oxide cannot uniformly be covered with the lithium titanium composite oxide. Further, as the process includes a pulverizing step after the heat treatment, the covering lithium titanium composite oxide tends to be separated, whereby the particle surface cannot uniformly be covered with the lithium titanium composite oxide. Therefore, on the particle surface, there are a portion where a large amount of the lithium titanium composite oxide is present and a portion where substantially no lithium titanium composite oxide is present, and with respect to the layer of the lithium titanium composite oxide present on the particle surface, there are a thick portion and a thin portion, and thus the covering is non-uniform. Further, the lithium titanium composite oxide covering the particle surface is considered to have a low lithium ion conductivity and to be insufficient in e.g. the stability at the time of charge and discharge and at the time of heating. Thus, the lithium cobalt oxide disclosed in Patent Document 1 has no sufficient performance from the viewpoint of the battery performance such as the discharge capacity, the high rate property, the durability for charge and discharge cycles, and the safety.

Further, in Patent Document 2, lithium hydroxide and titanium tetrachloride are added to a solution having a preliminarily prepared lithium-containing composite oxide dispersed, followed by heat treatment to obtain a surface modified lithium-containing composite oxide. However, if titanium tetrachloride is used as a titanium source, after titanium hydroxide colloidal particles are formed, they are adsorbed on the particle surface of the lithium-containing composite oxide. The surface modification using such colloidal particles cannot make the particle source be uniformly covered and in addition, deteriorates the battery performance such as the discharge capacity, and the durability for charge and discharge cycles, since chlorine derived from titanium tetrachloride remains as impurities. Further, the lithium titanium composite oxide covering the particle surface is considered to have low lithium ion conductivity and be insufficient e.g. in the stability at the time of charge and discharge and at the time of heating. Thus, the lithium cobalt oxide disclosed in Patent Document 2 has no sufficient performance from the viewpoint of the battery performance such as the discharge capacity, the high rate property, the durability for charge and discharge cycles, and the safety.

Further, in Patent Document 3, a lithium/manganese-containing composite oxide having the particle surface covered with $LiAlTiO_4$ having a spinel structure is obtained by adding lithium nitrate and a nitrate of a metal to a suspension having a lithium/manganese-containing composite oxide represented by $Li_{1.1}Mn_{1.9}O_4$ dispersed, followed by stirring, firing and the like. However, with respect to the covering $LiAlTiO_4$, lithium ions contained in the compound itself move at the time of charge and discharge, and desorption from the crystal lattice or insertion to the crystal lattice is repeatedly carried out, whereby the state of presence of the surface layer tends to be changed, and the electrochemical stability tends to be decreased, and accordingly the durability for charge and discharge cycles will be decreased. From such reasons, the lithium/manganese-containing composite oxide disclosed in Patent Document 3 has no sufficient performance.

Under these circumstances, it is an object of the present invention to provide a surface modified lithium-containing composite oxide which has large discharge capacity and volume capacity density, high safety, excellent durability for charge and discharge cycles and high rate property, a process for producing the surface modified lithium-containing composite oxide, a positive electrode for a lithium secondary battery containing the surface modified lithium-containing composite oxide, and a lithium secondary battery.

Solution to Problem

The present inventors have conducted extensive studies and as a result, they have found that the above object is achieved by using a surface modified lithium-containing composite oxide comprising lithium-containing composite oxide particles and a lithium titanium composite oxide contained in the surface layer of the particles, the lithium titanium composite oxide containing lithium, titanium and element Q (wherein Q is at least one element selected from the group consisting of B, Al, Sc, Y and In) having a peak at a predetermined position in powder X-ray diffraction measurement in which CuKα rays are used. Further, they have found that the surface modified lithium-containing composite oxide of the present invention can be efficiently obtained by impregnating a preliminarily prepared powder of a lithium-containing composite oxide with a solution having a lithium source, a titanium source and an element Q source dissolved, followed by heat treatment. That is, the present invention provides the following.

(1) A process for producing a surface modified lithium-containing composite oxide, which comprises impregnating a powder of lithium-containing composite oxide particles represented by the formula: $Li_wN_xM_yO_zF_a$ (wherein N is at least one element selected from the group consisting of Co, Mn and Ni, M is at least one element selected from the group consisting of Al, Zn, Sn, alkaline earth metal elements and transition metal elements other than Co, Mn and Ni, and w, x, y, z and "a" satisfy the following: $0.9 \leq w \leq 1.3$, $0.9 \leq x \leq 2.0$, $0 \leq y \leq 0.1$, $1.9 \leq z \leq 4.2$, and $0 \leq a \leq 0.05$) with a solution having a lithium source, a titanium source and an element Q source (wherein Q is at least one element selected from the group consisting of B, Al, Sc, Y and In) dissolved, and subjecting the obtained lithium source-titanium source-element Q source-impregnated particles to heat treatment at from 500 to 1,000° C., wherein a lithium titanium composite oxide containing lithium, titanium and element Q is contained in the surface layer of the particles in a proportion of the total amount of titanium and element Q in the lithium titanium composite oxide to the lithium-containing composite oxide particles of from 0.01 to 2 mol %, and the lithium titanium composite oxide has a peak at a diffraction angle 2θ within a range of 43.8±0.5° in powder X-ray diffraction measurement in which CuKα rays are used.

(2) The process according to the above (1), wherein the atomic ratio (element Q/titanium) of element Q to titanium contained in the solution having a lithium source, a titanium source and an element M source dissolved, satisfies 0<element Q/titanium≤1.

(3) The process according to the above (1) or (2), wherein the atomic ratio (lithium/(element Q+titanium)) of lithium to the total amount of element Q and titanium contained in the solution having a lithium source, a titanium source and an element Q source dissolved, satisfies 0.55≤lithium/(element Q+titanium)≤1.8.

(4) The process according to any one of the above (1) to (3), wherein the solution having a lithium source, a titanium source and an element Q source dissolved contains a carboxylic acid having at least 2 carboxy groups, or at least 2 in total of carboxy groups and hydroxy groups or carbonyl groups.

(5) The process according to any one of the above (1) to (4), wherein the solution having a lithium source, a titanium source and an element Q source dissolved has a pH of from 1 to 7.

(6) The process according to any one of the above (1) to (5), wherein the titanium source is titanium lactate.

(7) The process according to any one of the above (1) to (6), wherein element Q contains boron, and a boron source is boron oxide.

(8) The process according to any one of the above (1) to (7), wherein element Q contains aluminum, and an aluminum source is basic aluminum lactate.

(9) The process according to any one of the above (1) to (8), wherein element Q contains indium, and an indium source is indium acetate.

(10) The process according to any one of the above (1) to (9), wherein the solution having a lithium source, a titanium source and an element Q source dissolved is an aqueous solution.

(11) The process according to any one of the above (1) to (10), wherein the lithium source is lithium carbonate.

(12) The process according to any one of the above (1) to (11), wherein the lithium titanium composite oxide has a peak at a diffraction angle 2θ within a range of 63.1±0.5° in powder X-ray diffraction measurement in which CuKα rays are used.

(13) The process according to any one of the above (1) to (12), wherein the lithium titanium composite oxide has a crystal structure of space group Fm-3m.

(14) A surface modified lithium-containing composite oxide, comprising lithium-containing composite oxide particles represented by the formula: $Li_wN_xM_yO_zF_a$ (wherein N is at least one element selected from the group consisting of Co, Mn and Ni, M is at least one element selected from the group consisting of Al, Zn, Sn, alkaline earth metal elements and transition metal elements other than Co, Mn and Ni, and w, x, y, z and "a" satisfy the following: $0.9 \leq w \leq 1.3$, $0.9 \leq x \leq 2.0$, $0 \leq y \leq 0.1$, $1.9 \leq z \leq 4.2$, and $0 \leq a \leq 0.05$), and a lithium titanium composite oxide containing lithium, titanium and element Q (wherein Q is at least one element selected from the group consisting of B, Al, Sc, Y and In) contained in the surface layer of the particles, wherein the proportion of the total amount of titanium and element Q in the lithium titanium composite oxide to the lithium-containing composite oxide particles is from 0.01 to 2 mol %, and the lithium titanium composite oxide has a peak at a diffraction angle 2θ within a range of 43.8±0.5° in powder X-ray diffraction measurement in which CuKα rays are used.

(15) The surface modified lithium-containing composite oxide according to the above (14), wherein the atomic ratio (element Q/titanium) of element Q to titanium contained in the lithium titanium composite oxide satisfies 0<element Q/titanium≤1.

(16) The surface modified lithium-containing composite oxide according to the above (14) or (15), wherein the atomic ratio (lithium/(element Q+titanium)) of lithium to the total amount of element Q and titanium contained in the lithium titanium composite oxide satisfies 0.55≤lithium/(element Q+titanium)≤1.8.

(17) The surface modified lithium-containing composite oxide according to any one of the above (14) to (16), wherein M is at least one element selected from the group consisting of Al, Ti, Zr, Hf, Nb, Ta, Mg, Sn and Zn.

(18) The surface modified lithium-containing composite oxide according to any one of the above (14) to (17), wherein the lithium titanium composite oxide has a peak at a diffraction angle 2θ within a range of 63.1±0.5° in powder X-ray diffraction measurement in which CuKα rays are used.

(19) The surface modified lithium-containing composite oxide according to any one of the above (14) to (18), wherein the lithium titanium composite oxide has a crystal structure of space group Fm-3m.

(20) A positive electrode for a lithium ion secondary battery, which comprises a cathode active material, an electroconductive material and a binder, wherein the cathode active material is the surface modified lithium-containing composite oxide as defined in any one of the above (14) to (19).

(21) A lithium ion secondary battery, which comprises a positive electrode, a negative electrode and an electrolytic solution, wherein the positive electrode is the positive electrode for a lithium ion secondary battery as defined in the above (20).

Advantageous Effects of Invention

According to the present invention, it is possible to provide a surface modified lithium-containing composite oxide useful as a positive electrode for a lithium ion secondary battery, having large discharge capacity and volume capacity density, and excellent in the safety, the durability for charge and discharge cycles and the high rate property, its production process, a positive electrode for a lithium ion secondary battery containing the surface modified lithium-containing composite oxide, and a lithium ion secondary battery.

The reason why the surface modified lithium-containing composite oxide according to the present invention demonstrates the above-mentioned excellent properties as the positive electrode for a lithium ion secondary battery, is not necessarily clear, but it is considered substantially as follows.

In general, the lithium-containing composite oxide used as the positive electrode of a battery has an organized crystal structure, but by the movement of lithium ions at the time of charge and discharge or under a state where the lithium ions are withdrawn at the time of charge, its crystal structure tends to be unstable, and the crystals are collapsed, thus leading to a remarkable decrease in the discharge capacity or significant heat generation. Thus, it is considered that by incorporating a lithium titanium composite oxide containing aluminum or boron, or the like, having excellent lithium ion conductivity and very high stability at the time of charge and discharge and at the time of heating, in the surface layer of the particle surface, the lithium-containing composite oxide can be stabilized, and the battery performance such as the safety, the durability for charge and discharge cycles and the high rate property can be improved. Further, it is considered that by incorporating a trivalent element having the same valency as titanium, such as aluminum or boron, and having an ion radius close to that of a titanium ion, some of titanium atoms are replaced by the incorporated element, whereby the crystal structure can be reinforced, and accordingly the crystal structure can be strongly remained even at the time of charge and discharge and at the time of heating, and the battery performance can be improved.

Further, if the surface of particles is covered with a compound having low lithium ion conductivity, the covering compound will not contribute to charge and discharge and will polarized, whereby the discharge capacity will be decreased. However, a lithium titanium composite oxide containing aluminum or boron or the like, is considered to be excellent in the lithium ion conductivity, to reduce the impedance and to contribute to charge and discharge, and thus with the surface modified lithium-containing composite oxide of the present invention, no decrease in the discharge capacity is observed. Further, the lithium titanium composite oxide according to the present invention, which contains aluminum or boron or the like, has high electrical conductivity, and thus the high rate property, the charge and discharge efficiency, etc. can further be improved.

Further, by using a lithium titanium composite oxide having a crystal structure such as having a peak at the above predetermined position in powder X-ray diffraction measurement, the durability for charge and discharge cycles, the high rate property, etc. can further be improved.

Further, according to the production process of the present invention, a surface modified lithium-containing composite oxide having the above excellent effect can easily be obtained.

DESCRIPTION OF EMBODIMENTS

In the present invention, the lithium titanium composite oxide contained in the surface layer of the particles of the lithium-containing composite oxide is a composite oxide containing at least lithium, titanium and element Q. Element Q represents at least one element selected from the group consisting of boron (B), aluminum (Al), scandium (Sc), yttrium (Y) and indium (In), and among them, it is preferably at least one element selected from the group consisting of B, Al and In, more preferably Al. Aluminum has its ion radius of 0.53 Å, which is relatively close to an ion radius of a titanium ion of 0.67 Å, and accordingly it is likely to replace titanium to form a compound having a firm crystal structure, whereby the durability for charge and discharge cycles, the high rate property and the safety tend to improve.

The content of the lithium titanium composite oxide contained in the surface layer is such that the total content of titanium and element Q contained in the composite oxide is from 0.01 to 2 mol %, preferably from 0.05 to 1.5 mol % based on to the lithium-containing composite oxide as a base material. The total content of titanium and element Q contained in the surface layer of the particles in the present invention means a value of the total content of titanium and element Q contained in the surface layer obtained by calculation from the total amount of a titanium source and an element Q source to be used for preparation of a coating solution and from the amount of the lithium-containing composite oxide used as a base material. Specifically, in a case where a coating solution having $W_{Ti}$ (g) of a titanium compound having a titanium content $C_{Ti}$ (% by weight) and $W_Q$ (g) of a compound of element Q having an element Q content $C_Q$ (% by weight) dissolved is used based on $W_B$ (g) of a base material having a formula weight $M_B$ determined by the compositional analysis of the base material, for covering treatment, the total amount (mol %) of titanium and element Q contained in the surface layer is determined in accordance with the following formula, where the atomic weight of titanium is $M_{Ti}$ and the atomic weight of element Q is $M_Q$:

Total amount (mol %) of titanium and element Q contained in surface layer=$100 \times [(C_{Ti} \times W_{Ti})/M_{Ti} + (C_Q \times W_Q)/M_Q]/[(W_B/M_B)]$ Further, also in a case where titanium and Q are contained in the lithium-containing composite oxide as the base material, the total amount (mol %) of titanium and element Q contained in the surface layer is a value determined in the same manner as above.

In the present invention, the atomic ratio (element Q/titanium) of element Q to titanium contained in the lithium titanium composite oxide contained in the surface layer preferably satisfies 0<element Q/titanium≤1, more preferably satisfies 0.01≤element Q/titanium≤0.5, particularly preferably satisfies 0.05≤element Q/titanium≤0.25. Further, the atomic ratio (lithium/(element Q+titanium)) of lithium to the total amount of element Q and titanium contained in the lithium titanium composite oxide according to the present invention preferably satisfies 0.55≤lithium/(element Q+titanium)≤1.8, more preferably satisfies 0.71≤lithium/(element Q+titanium)≤1.5, particularly preferably satisfies 0.85≤lithium/(element Q+titanium)≤1.2. When these ratios are within such ranges, a positive electrode containing the obtained surface modified lithium-containing composite oxide can suppress a decrease in the discharge capacity, and has improved charge and discharge efficiency, durability for charge and discharge cycles and high rate property, and has improved safety.

In the present invention, the lithium titanium composite oxide contained in the surface layer has a peak at 2θ within a range of 43.8±0.5° in powder X-ray diffraction measurement in which CuKα rays are used. Further, the lithium titanium composite oxide is preferably a compound further having a peak at 2θ within a range of 63.1±0.5° in powder X-ray diffraction measurement in which CuKα rays are used. Further, the lithium titanium composite oxide is preferably a compound having a cubic crystal structure. Further, the lithium titanium composite oxide is preferably a compound having a crystal structure of space group Fm-3m. These peaks and crystal structures can be confirmed from an X-ray diffraction spectrum obtainable by powder X-ray diffraction measurement in which CuKα rays are used. A compound such as $LiAlTiO_4$ having a spinel structure has no peak at 2θ within ranges of 43.8±0.5° and 63.1±0.5°, and is not a compound having a crystal structure of space group Fm-3m.

In the present invention, it is preferred that the lithium titanium composite oxide exists in the surface layer of particles at a higher concentration than the interior of the particles of the surface modified lithium-containing composite oxide to be finally obtained. It is considered that by the lithium titanium composite oxide existing on the particle surface, the contact area with an electrolytic solution can be decreased, and resultingly, the safety is improved, and the durability for charge and discharge cycles is improved. In the present invention, the surface layer of particles of the lithium-containing composite oxide means a part from the surface of primary particles to 100 nm from the surface of the particles.

In the present invention, since the coating solution infiltrates into the gap between the primary particles, it is considered that the primary particle surface can be uniformly covered as compared with a case where conventional solid phase reaction or a dispersed particles-containing solution is employed, whereby the performance of the battery can be further improved. Further, even in a case where the particles of the lithium-containing composite oxide form secondary agglomerated particles, the surface of the primary particles can be uniformly covered.

Further, the average particle size D50 of the surface modified lithium-containing composite oxide is preferably from 5 to 30 μm, more preferably from 8 to 25 μm, and the specific surface area is preferably from 0.1 to 0.7 m²/g, more preferably from 0.15 to 0.5 m²/g. Further, the half value width of the diffraction peak of (110) plane at 2θ=66.5±1° as measured by means of X-ray diffraction in which CuKα rays are used as a radiation source, is preferably from 0.08 to 0.14°, more preferably from 0.08 to 0.12°.

Here, the average particle size D50 in the present invention means a volume-based accumulative 50% size (D50) which is a particle size at a point of 50% on an accumulative curve when the accumulative curve is drawn so that a particle size distribution is obtained on the volume basis and the whole volume is 100%. The particle size distribution is obtained from a frequency distribution and accumulative volume distribution curve measured by means of a laser scattering particle size distribution measuring apparatus. The measurement of particle sizes is carried out by measuring the particle size distribution while the powder is sufficiently dispersed in an aqueous medium by an ultrasonic treatment or the like (for example, using Microtrack HRAX-100 manufactured by NIKKISO CO., LTD.). Furthermore, D10 means a volume-based accumulative 10% size, and D90 means a volume-based accumulative 90% size.

Further, with respect to the surface modified lithium-containing composite oxide of the present invention, the average particle size D50 means a volume-averaged particle size of secondary particles which are formed by mutual agglomeration and sintering of primary particles, and in a case where the particles are composed of the primary particles only, it means a volume-averaged particle size of the primary particles.

Further, the press density of the surface modified lithium-containing composite oxide of the present invention is preferably from 2.7 to 3.4 g/cm³, particularly preferably from 2.8 to 3.3 g/cm³. In the present invention, the press density means an apparent density of the powder of the surface modified lithium-containing composite oxide when the powder is pressed under a pressure of 0.3 ton/cm².

Further, in the surface modified lithium-containing composite oxide of the present invention, the amount of remaining alkali is preferably at most 0.035% by weight, particularly preferably at most 0.02% by weight. In the present invention, the amount of remaining alkali is determined from such a hydrochloric acid aqueous solution that 5 g of a powder of the surface modified lithium-containing composite oxide is dispersed in 50 g of pure water and stirred for 30 minutes, followed by filtration, and the obtained filtrate is subjected to potentiometric titration with a 0.02 mol %/liter hydrochloric acid aqueous solution, which is used up to a pH of 4.0.

The lithium-containing composite oxide used as a base material in the present invention is obtained by a known method and is represented by the formula $Li_w N_x M_y O_z F_a$. In the formula, w, x, y, z and "a" are as defined above. Particularly, w, x, y, z and "a" are respectively preferably as follows. 0.95≤w≤1.3, 0.9≤x≤1.0, 0≤y≤0.1, 1.9≤z≤2.1 and 0≤a≤0.05. Here, when "a" is higher than 0, the composite oxide is a composite oxide wherein some of oxygen atoms are substituted by fluorine atoms, and in such a case, the safety of a cathode active material to be obtained is improved. w, x, y, z and "a" are respectively particularly preferably as follows. $0.97 \leq w \leq 1.1$, $0.97 \leq x \leq 1.00$, $0.0005 \leq y \leq 0.05$, $1.95 \leq z \leq 2.05$ and $0.001 \leq a \leq 0.01$.

In the above formula, element N is at least one element selected from the group consisting of Co, Mn and Ni. Particularly, element N is preferably Co, Ni, Co and Ni, Mn and Ni or Co, Ni and Mn, more preferably Co, or a combination of Co, Ni and Mn, particularly preferably Co.

In the present invention, the molar ratio $w/(x+y)$ which is a value obtained by dividing the molar amount of lithium in the lithium-containing composite oxide by the total amount of element N and element M is particularly preferably from 0.97 to 1.10. it is more preferably from 0.99 to 1.05, and in such a case, the particle growth of the lithium-containing composite oxide will be accelerated, and particles with a higher density can be obtained.

In the present invention, element M is at least one element selected from the group consisting of Al, Zn, Sn, alkaline earth metal elements and transition metal elements other than Co, Mn and Ni. Here, the above transition metal elements represent transition metals of Group 4, Group 5, Group 6, Group 7, Group 8, Group 9, Group 10 or Group 11 in the Periodic Table. Particularly, element M is preferably at least one element selected from the group consisting of Al, Ti, Zr, Hf, Nb, Ta, Mg, Sn and Zn. Particularly, from the viewpoint of the high capacity, the safety, the durability for charge and discharge cycles, etc., element M is more preferably at least one element selected from the group consisting of Al, Ti, Zr, Hf and Mg, particularly preferably at least one element selected from the group consisting of Al, Zr and Mg.

The process for producing the surface modified lithium-containing composite oxide of the present invention is not particularly limited, but the composite oxide can efficiently be obtained as follows. A preliminarily prepared powder of a lithium-containing composite oxide is impregnated with a solution having a lithium source, a titanium source and an element Q source dissolved (this solution will sometimes be referred to as a coating solution in the present invention), and the obtained lithium source-titanium source-element Q source-impregnated particles are subjected to heat treatment to efficiently obtain the surface modified lithium-containing composite oxide of the present invention. In the present invention, a mixture obtained by impregnating the particles of a lithium-containing composite oxide with a solution having a lithium source, a titanium source and an element Q source dissolved will be referred to as lithium source-titanium source-element Q source-impregnated particles. Further, this coating solution is preferably an aqueous solution. The aqueous solution means a solution which contains, as a solvent, water as the main component and which may contain an alcohol, ethylene glycol, glycerol or the like in addition to water. A specific proportion of water is preferably at least 80 vol %, more preferably at least 90 vol %, further preferably at least 95 vol % to the total amount of water and solvents other than water. On the other hand, the upper limit is preferably such that the solvent consists solely of water, that is, the proportion of water is 100 vol %, from the viewpoint of the burden on the environment.

In the present invention, the atomic ratio (element Q/titanium) of element Q to titanium contained in the coating solution preferably satisfies 0<element Q/titanium≤1, more preferably satisfies 0.01≤element Q/titanium≤0.5, particularly preferably satisfies 0.05≤element Q/titanium≤0.25. Further, the atomic ratio (lithium/(element Q+titanium)) of lithium to the total amount of element Q and titanium, contained in the coating solution, preferably satisfies 0.55≤lithium/(element Q+titanium)≤1.8, more preferably satisfies 0.71≤lithium/(element Q+titanium)≤1.5, particularly preferably satisfies 0.85≤lithium/(element Q+titanium)≤1.2.

Further, in the present invention, a preliminarily prepared powder of a lithium-containing composite oxide (sometimes referred to as a base material in the present invention) is impregnated with the solution having a lithium source, a titanium source and an element Q source dissolved, followed by heat treatment at a specific temperature, whereby it is possible to let the lithium titanium composite oxide extremely uniformly exist. As a result, it is considered that the battery performance such as the safety and the durability for charge and discharge cycles, can be further improved. One of characteristics of the coating solution used in the present invention is that it contains a lithium source, a titanium source and an element Q source. Accordingly, the composition of the lithium titanium composite oxide can easily be controlled.

In the present invention, the coating solution preferably contains a carboxylic acid. The carboxylic acid is preferably a carboxylic acid having at least 2 carboxy groups or at least 2 in total of carboxy groups and hydroxy groups or carbonyl groups. Such a carboxylic acid is preferably used, since it can improve the solubility of the lithium source and the titanium source and raise the concentration of lithium ions and titanium ions dissolved in the aqueous solution. Particularly preferred is a case where it has a molecular structure wherein from 2 to 4 carboxy groups exist and further from 1 to 4 hydroxy groups coexist, since the solubility can thereby be made high. The carboxylic acid is particularly preferably an aliphatic carboxylic acid having from 2 to 8 carbon atoms. When the number of carbon atoms is from 2 to 8, the solubility of the lithium source, the titanium source and the element Q source will be improved, and the number of carbon atoms is particularly preferably from 2 to 6. For the coating solution, water, an alcohol such as ethanol or methanol or the like can be used, and among them, water is preferably used from the viewpoint of the influence over the environment and the cost.

The aliphatic carboxylic acid having from 2 to 8 carbon atoms is preferably citric acid, tartaric acid, oxalic acid, malonic acid, maleic acid, malic acid, racemic acid, lactic acid or glyoxylic acid, particularly preferably citric acid, maleic acid, lactic acid or tartaric acid, since it is possible to raise the solubility and the cost is relatively low. When a carboxylic acid with a high acidity is used, the lithium-containing composite oxide is dissolved in some cases when the pH of the coating solution is lower than 1, and thus it is preferred to add a base such as ammonia. Specifically, the pH of the coating solution is preferably at least 1 and at most 7, more preferably at least 3 and at most 7, further preferably at least 5 and at most 7. By controlling the pH to be within such a range, a coating solution having lithium ions, titanium ions and Q ions dissolved at high concentrations can be obtained, whereby an aqueous medium and the like can easily be removed in the subsequent mixing or heat treatment step.

Further, it is possible to adjust the pH of the coating solution by adding a pH adjuster and/or an aqueous alkaline solution to the coating solution. The pH adjuster to be used may be ammonia, ammonium bicarbonate or the like. The aqueous alkaline solution to be used may be an aqueous solution of e.g. a hydroxide such as sodium hydroxide, potassium hydroxide or lithium hydroxide.

The coating solution to be used in the present invention is required to be such that the lithium source, the titanium source and the element Q source are dissolved as uniformly as possible, and a suspension and a colloidal solution are not included in the coating solution of the present invention, because no sufficient effects of the present invention are obtained if a suspension or a colloidal solution is used. That is, the coating solution of the present invention is required to be such that the lithium source and the titanium source are dissolved to such an extent that they are not visually recognized as solid components or colloidal particles.

The lithium source, the titanium source and the element Q source to be used for preparation of the coating solution are preferably the ones dissolved uniformly in the solution. For example, preferred is an inorganic salt such as an oxide, a hydroxide, a carbonate or a nitrate, an organic salt such as an acetate, an oxalate, a citrate or a lactate, an organic metal chelate complex, a compound wherein a metal alkoxide is stabilized by e.g chelate, or a mixture thereof. Among them, more preferred is the oxide, the hydroxide, the carbonate, the nitrate, the acetate, the oxalate, the citrate or the lactate or the mixture thereof.

The coating solution to be used in the present invention can be prepared with heating, if necessary. Preferred is to heat at from 40° C. to 80° C., particularly preferably at from 50° C. to 70° C. The heating makes the dissolution of the lithium source, the titanium source and the element Q source proceed easily, whereby the lithium source, the titanium source and the element Q source can be stably dissolved in a short period of time.

In the present invention, the higher the total concentration of the lithium source, the titanium source and the element Q source contained in the coating solution to be used in the present invention, the better, since it is desired that the aqueous medium is in a small amount in the subsequent step of heat treatment. However, if the concentration is too high, the viscosity will become high to deteriorate the mixing property with the lithium source, the titanium source and the element Q source, and whereby it will be difficult to coat the surface of particles of the lithium-containing composite oxide uniformly with the lithium titanium composite oxide. Therefore, the total concentration of the above respective elements is preferably from 0.01 to 30% by weight, more preferably from 0.1 to 15% by weight.

The above coating solution may contain an alcohol such as methanol or ethanol, or a polyol having an effect to let a complex form. Examples of the polyol include ethylene glycol, propylene glycol, diethylene glycol, dipropylene glycol, polyethylene glycol and butane diol glycerin. When these compounds are contained, the content is preferably from 1 to 20% by weight in the coating solution.

Further, as the titanium source in the coating solution of the present invention, titanium lactate is preferred. Titanium lactate has carboxy groups and hydroxy groups in the molecule, whereby the chelate effect stabilizes lithium ions, titanium ions and element Q ions contained in the coating solution. Further, in the element Q source, in a case where element Q contains B, a boron source therefor is preferably boron oxide, in a case where element Q contains Al, an aluminum source therefor is preferably aluminum lactate, and in a case where element Q contains In, an indium source therefor is preferably indium acetate.

Further, as the lithium source in the coating solution of the present invention, it is preferred to use lithium carbonate or lithium hydroxide, and more preferred is lithium carbonate available at a lower cost among them. The average particle size D50 of the lithium source is preferably from 2 to 25 μm, whereby it is easily dissolved.

The method of impregnating the lithium-containing composite oxide with the coating solution is not limited, but may be a means for impregnation by spraying the coating solution to the powder of the lithium-containing composite oxide, or a means for impregnation by mixing and stirring the coating solution and the lithium-containing composite oxide in a container. Specific examples of the spraying means include a spray drier, a flash drier, a belt drier or a thermoprocessor. The means of mixing and stirring in a container to be used may, for example, be a twin screw kneader, an axial mixer, a paddle mixer, a turbulizer, a lodige mixer or a drum mixer. In this case, a solid content concentration in the slurry is preferably as high as possible as long as the mixture is uniformly mixed, and a ratio (solid/liquid) of the solid component to the liquid component based on weight is preferably from 30/70 to 99.5/0.5, more preferably from 85/15 to 99/1, particularly preferably from 90/10 to 97/3. Further, it is preferred to perform reduced pressure treatment while carrying out impregnation, since it is thereby possible to simultaneously dry the lithium source-titanium source-element Q source-impregnated particles in a short time.

After impregnating the powder of the lithium-containing composite oxide of the present invention with the coating solution, the obtained impregnated particles can be dried. In this case, the impregnated particles are dried preferably at from 15 to 200° C., particularly preferably at from 50 to 120° C., for from 0.1 to 10 hours. Since the aqueous medium in the impregnated particles will be removed in a subsequent step of heat treatment, it is not necessary to remove it completely at this stage. However, it is preferred to remove it as much as possible at this stage, since a lot of energy will be required to volatilize moisture in a subsequent step of heat treatment.

Further, the temperature during heat treatment of the lithium source-titanium source-element Q source-impregnated particles of the present invention is from 500 to 1,000° C., more preferably from 600 to 900° C., further preferably from 700 to 800° C. When heat treatment is carried out within such a temperature range, it is possible to obtain a surface modified lithium-containing composite oxide having further improved battery characteristic such as the discharge capacity, the durability for charge and discharge cycles and the safety. The heat treatment is preferably carried out in an oxygen-containing atmosphere, specifically, more preferably in an atmosphere at an oxygen concentration of from 10 to 40 vol %.

In a case where a positive electrode for a lithium ion secondary battery is to be produced from such a surface modified lithium-containing composite oxide, the powder of the composite oxide is mixed with a carbon type electroconductive material such as acetylene black, graphite or Ketjenblack and a binder material. As the above binder material, polyvinylidene fluoride, polytetrafluoroethylene, polyamide, carboxymethyl cellulose or an acrylic resin may, for example, be preferably employed. The powder of the surface modified lithium-containing composite oxide of the present invention, the electroconductive material and the binder material will be formed into a slurry or a kneaded product by using a solvent or a dispersion medium. The resultant is supported on a positive electrode current collector such as an aluminum foil or a stainless steel foil by e.g. coating to form a positive electrode for a lithium ion secondary battery.

In the lithium ion secondary battery using the surface modified lithium-containing composite oxide of the present invention as the cathode active material, a film of a porous polyethylene or a porous polypropylene may, for example, be used as a separator. Furthermore, as the solvent for the electrolytic solution of a battery, various solvents may be used, and a carbonate ester is preferred. As the carbonate ester, each of a cyclic type and a chain type can be used. As the cyclic carbonate ester, propylene carbonate or ethylene carbonate (EC) may, for example, be mentioned. As the chain carbonate ester, dimethyl carbonate, diethyl carbonate (DEC), ethyl methyl carbonate (EMC), methyl propyl carbonate or methyl isopropyl carbonate may, for example, be mentioned.

In the present invention, the above carbonate ester may be used alone or two or more of them may be used as mixed. Moreover, it may be used as mixed with another solvent. Furthermore, depending upon the material of the anode active material, there may be a case where the discharge property, the durability for charge and discharge cycles, or the charge and discharge efficiency can be improved by a combined use of a chain carbonate ester and a cyclic carbonate ester.

Further, in the lithium ion secondary battery using the surface modified lithium-containing composite oxide of the present invention as the cathode active material, a gel polymer electrolyte containing a vinylidene fluoride-hexafluoropropylene copolymer (for example, KYNAR manufactured by ELF Atochem) or a vinylidene fluoride-perfluoropropyl vinyl ether copolymer may be employed. As the solute to be added to the electrolytic solvent or the polymer electrolyte, at least one member of lithium salts is preferably used, wherein e.g. $ClO_4^-$, $CF_3SO_3^-$, $BF_4^-$, $PF_6^-$, $AsF_6^-$, $SbF_6^-$, $CF_3CO_2^-$ or $(CF_3SO_2)_2N^-$ is anion. The lithium salt is preferably used in a concentration of from 0.2 to 2.0 mol/l (liter) to the electrolytic solvent or the polymer electrolyte comprising the lithium salt. If the concentration departs from this range, ionic conductivity will decrease, and the electrical conductivity of the electrolyte will decrease. The concentration is particularly preferably from 0.5 to 1.5 mol/l.

In the lithium ion secondary battery using the surface modified lithium-containing composite oxide of the present invention as the cathode active material, a material which can occlude and discharge lithium ions may be used for the anode active material. The material forming the anode active material is not particularly limited, however, lithium metal, a lithium alloy, a carbon material, an oxide comprising, as a main component, a metal of Group 14 or Group 15 in the Periodic Table, a carbon compound, a silicon carbide compound, a silicon oxide compound, titanium sulfide, or a boron carbide compound may, for example, be mentioned. As the carbon material, one having an organic material thermally decomposed under various thermal decomposition conditions, artificial graphite, natural graphite, soil graphite, exfoliated graphite or flake graphite may, for example, be used. Further, as the oxide, a compound comprising tin oxide as a main component can be used. As the negative electrode current collector, a copper foil or a nickel foil may, for example, be used. The negative electrode is produced preferably by kneading the anode active material with an organic solvent to form a slurry, which is applied to the metal foil current collector, dried and pressed.

There are no particular restrictions on the shape of the lithium battery using the surface modified lithium-containing composite oxide of the present invention as the cathode active material. The shape is selected from a sheet shape, a film shape, a folded shape, a wound cylinder with bottom, a button shape and so on, depending upon the intended purpose.

EXAMPLES

Now, the present invention will be described in further detail with reference to Examples. However, the present invention is by no means restricted to such specific Examples.

Example 1

In an aqueous solution having 1.93 g of magnesium carbonate, 20.89 g of aluminum maleate having an Al content of 2.65% by weight and 7.76 g of citric acid monohydrate dissolved in 23.12 g of water, 1.29 g of a zirconium ammonium carbonate aqueous solution having a zirconium content of 14.5% by weight was mixed to obtain an aqueous solution. Then, to this aqueous solution, 197.32 g of cobalt oxyhydride having an average particle size of 13 μm and a cobalt content of 60.0% by weight was added and mixed to obtain a mixture. The resultant mixture was dried in a constant-temperature oven kept at 80° C., and 77.69 g of lithium carbonate having a lithium content of 18.7% by weight was added and mixed in a mortar, and the mixture was fired in the air at 990° C. for 14 hours and crushed to obtain a lithium-containing composite oxide having a composition of $Li_{1.01}(Co_{0.979}Mg_{0.01}Al_{0.01}Zr_{0.001})_{0.99}O_2$.

Then, 9.59 g of a titanium lactate aqueous solution having a Ti content of 8.20% by weight, 0.55 g of lithium carbonate having a lithium content of 18.7% by weight and 2.45 g of a basic aluminum lactate aqueous solution having an Al content of 4.52% by weight were dissolved in 57.41 g of water to prepare a coating solution containing lithium, titanium and aluminum in an atomic ratio of Li:Ti:Al=0.72:0.8:0.2. The pH of the coating solution was 4.1.

Then, to 200 g of the above-obtained lithium-containing composite oxide, this coating solution was added and mixed, and the mixture was dried at 120° C. for 4 hours with stirring to obtain lithium source-titanium source-aluminum source-impregnated particles. The obtained lithium source-titanium source-aluminum source-impregnated particles were subjected to heat treatment in the air at 700° C. for 12 hours, followed by crushing to obtain a powder of a surface modified lithium-containing composite oxide having an average particle size D50 of 13.8 μm, D10 of 8.3 μm, D90 of 21.6 μm and a specific surface area of 0.29 m$^2$/g obtained by the BET method. The amount of the lithium titanium composite oxide contained in the surface layer was 1 mol % based on the lithium-containing composite oxide as a base material, and the amount of remaining alkali in the obtained surface modified lithium-containing composite oxide was 0.01% by weight.

Figure 1:
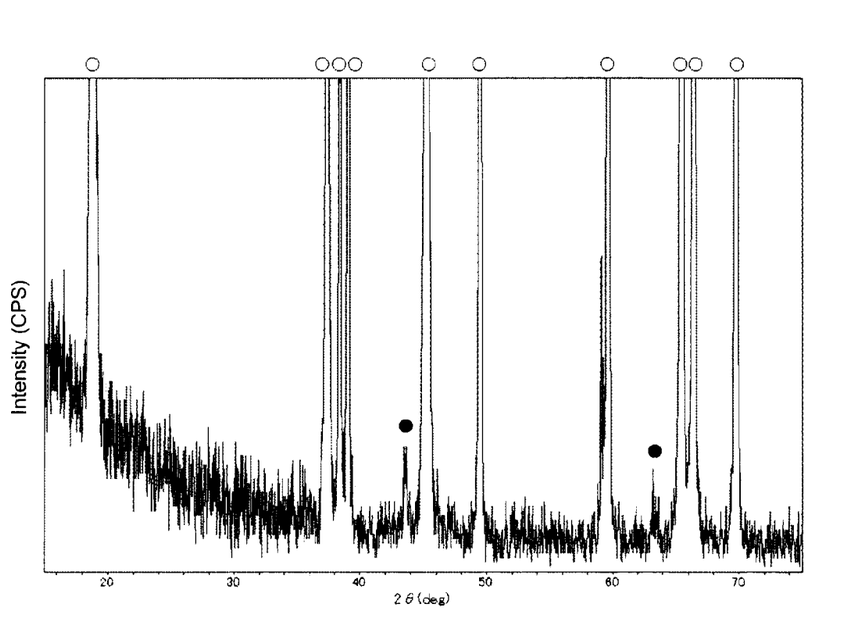
FIG. 1 is a X-ray diffraction spectrum of a surface modified lithium-containing composite oxide obtained in Example 1.

Further, an X-ray diffraction spectrum obtained by powder X-ray diffraction measurement in which CuKα rays were used, using RINT 2100 model manufactured by Rigaku Corporation, is shown in FIG. 1. It was confirmed from FIG. 1 that a compound having peaks at 2θ of 43.8±0.5° and 63.1±0.5° exists as shown by black circles, in addition to peaks with outlined circles, derived from the lithium-containing composite oxide as the base material. As a result of analyzing the obtained X-ray diffraction spectrum by a PDF card, the lithium titanium composite oxide was confirmed to have a cubic crystal structure. Further, it was confirmed that the space group of the crystals of the lithium titanium composite oxide substantially agree with the X-ray diffraction spectrum of a compound having the same cubic system and having space group Fm-3m. The half value width of a diffraction peak of (110) plane at 2θ=66.5±1° was 0.103°. The press density of the powder was 2.93 g/cm$^3$.

The above powder of the surface modified lithium-containing composite oxide, acetylene black and a polyvinylidene fluoride powder were mixed at a weight ratio of 90/5/5, and N-methylpyrrolidone was added to form a slurry, which was applied onto one side of an aluminum foil having a thickness of 20 μm, by a doctor blade. After drying, roll pressing was carried out five times to obtain a positive electrode sheet for a lithium battery.

Then, three simplified sealed cell type lithium batteries of stainless steel were assembled in an argon glove box, using a punched sheet from the positive electrode sheet as a positive electrode, a metal lithium foil having a thickness of 500 μm as a negative electrode, a nickel foil of 20 μm as a negative electrode current collector, a porous polypropylene having a thickness of 25 μm as a separator and a LiPF$_6$/EC+DEC (1:1) solution (which means a mixed solution of EC and DEC in a volume ratio (1:1) whose solute is LiPF$_6$; the same also applies to solvents as mentioned hereinafter) in a concentration of 1 M as an electrolytic solution.

One battery out of the above three was charged up to 4.5 V at a load current of 180 mA per 1 g of the cathode active material at 25° C., and discharged down to 2.75 V at a load current of 75 mA per 1 g of the cathode active material, thereby obtaining a discharge capacity per 1 g of the cathode active material (hereinafter sometimes referred to as 4.5 V initial discharge capacity), and with this battery, the charge and discharge cycle test was sequentially carried out 50 times. As a result, the 4.5 V initial discharge capacity of the positive electrode layer at 25° C. from 2.5 to 4.5 V was 186 mAh/g, the initial charge and discharge efficiency was 93.2%, the initial average electrical potential during discharge was 4.02 V, the capacity retention after 50 charge and discharge cycles was 96.1%, and the average electric potential during discharge was 4.02 V (hereinafter they will sometimes be referred to as 4.5 V initial charge and discharge efficiency, 4.5 V initial average electric potential, 4.5 V capacity retention and 4.5 V average electric potential, respectively).

Further, one battery out of the above three was charged up to 4.5 V at a load current of 180 mA per 1 g of the cathode active material at 25° C., discharged down to 2.75 V at a load current of 18 mA per 1 g of the cathode active material, and then the battery was subjected to charge and discharge cycles at a load current of 75 mA and at a high load current of 270 mA, thereby obtaining the 4.5 V discharge capacity at a high load current of 270 mA (hereinafter sometimes referred to as 4.5 V high rate discharge capacity) and the 4.5 V average electric potential (hereinafter sometimes referred to as 4.5 V high rate average electric potential). As a result, the 4.5 V high rate discharge capacity was 172 mAh/g, and the 4.5 V high rate average electric potential was 3.95 V.

Moreover, the other battery was charged up to 4.3 V over a period of 10 hours, then disassembled in the argon glove box. The positive electrode sheet after charged was taken out, washed, punched into a diameter of 3 mm, and then sealed with EC in an aluminum capsule. Then, while the temperature was raised at a rate of 5° C./min by a scanning differential calorimeter, the heat generation starting temperature was measured. As a result, the heat generation starting temperature of a heat generation curve of the 4.3 V-charged product was 173° C.

Example 2

A surface modified lithium-containing composite oxide was prepared in the same manner as in Example 1 except that as the coating solution, a coating solution obtained by dissolving 9.59 g of a titanium lactate aqueous solution having a Ti content of 8.20% by weight, 0.55 g of lithium carbonate having a lithium content of 18.7% by weight and 0.16 g of boron oxide having a boron content of 27.95% by weight in 59.72 g of water, containing lithium, titanium and boron in an atomic ratio of Li:Ti:B=0.72:0.8:0.2, was used. The pH of the coating solution was 3.8.

Of the obtained surface modified lithium-containing composite oxide, the average particle size D50 was 16.2 μm, D10 was 9.3 μm, D90 was 25.9 μm, and the specific surface area was 0.22 m$^2$/g obtained by the BET method. Further, the amount of the lithium titanium composite oxide contained in the surface layer was 1 mol % based on the lithium-containing composite oxide as the base material, the amount of remaining alkali in the obtained powder of the surface modified lithium-containing composite oxide was 0.02% by weight, and the press density was 2.94 g/cm$^3$.

With respect to the powder of the surface modified lithium-containing composite oxide, powder X-ray diffraction measurement was carried out in the same manner as in Example 1, and from the obtained X-ray diffraction spectrum, presence of a compound having peaks at 2θ=43.8±0.5° and 63.1±0.5° in addition to peaks derived from the lithium-containing composite oxide as the base material was confirmed. Further, as a result of analysis of the X-ray diffraction spectrum, the lithium titanium composite oxide was confirmed to have a cubic crystal structure. Further, it was confirmed that the space group of the crystals substantially agree with the X-ray diffraction spectrum of a compound having the same cubic system and having space group Fm-3m. Further, the half value width of the diffraction peak of (110) plane at 2θ=66.5±1° was 0.114°.

With respect to the surface modified lithium-containing composite oxide, electrodes and batteries were prepared and evaluated in the same manner as in Example 1. As a result, the 4.5 V initial discharge capacity was 184 mAh/g, the 4.5 V initial charge and discharge efficiency was 93.5%, the 4.5 V initial average electric potential was 4.03 V, the 4.5 V capacity retention was 93.5%, and the 4.5 V average electric potential was 4.03 V.

Further, the 4.5V high rate discharge capacity was 169 mAh/g, the 4.5V high rate average electric potential was 3.96 V. Further, the heat generation starting temperature was 167° C.

Example 3

A surface modified lithium-containing composite oxide was prepared in the same manner as in Example 1 except that as the coating solution, a coating solution obtained by dissolving 9.59 g of a titanium lactate aqueous solution having a Ti content of 8.20% by weight, 0.55 g of lithium carbonate having a lithium content of 18.7% by weight and 0.6 g of indium acetate having an In content of 39.3% by weight in 59.26 g of water, containing lithium, titanium and boron in an atomic ratio of Li:Ti:In=0.8:0.89:0.11, was used. The pH of the coating solution was 4.1.

Of the obtained surface modified lithium-containing composite oxide, the average particle size D50 was 13.3 μm, D10 was 8.1 μm, D90 was 20.8 μm, and the specific surface area was 0.26 m$^2$/g obtained by the BET method. Further, the amount of the lithium titanium composite oxide contained in the surface layer was 0.9 mol % based on the lithium-containing composite oxide as the base material, the amount of remaining alkali in the obtained powder of the surface modified lithium-containing composite oxide was 0.01% by weight, and the press density was 2.95 g/cm$^3$.

With respect to the powder of the surface modified lithium-containing composite oxide, powder X-ray diffraction measurement was carried out in the same manner as in Example 1, and from the obtained X-ray diffraction spectrum, presence of a compound having peaks at 2θ=43.8±0.5° and 63.1±0.5° in addition to peaks derived from the lithium-containing composite oxide as the base material was confirmed. Further, as a result of analysis of the X-ray diffraction spectrum, the lithium titanium composite oxide was confirmed to have a cubic crystal structure. Further, it was confirmed that the space group of the crystals substantially agree with the X-ray diffraction spectrum of a compound having the same cubic system and having space group Fm-3m. Further, the half value width of the diffraction peak of (110) plane at 2θ=66.5±1° was 0.112°.

With respect to the surface modified lithium-containing composite oxide, electrodes and batteries were prepared and evaluated in the same manner as in Example 1. As a result, the 4.5 V initial discharge capacity was 183 mAh/g, the 4.5 V initial charge and discharge efficiency was 93.2%, the 4.5 V initial average electric potential was 4.03 V, the 4.5 V capacity retention was 93.5%, and the 4.5 V average electric potential was 4.03 V.

Further, the 4.5V high rate discharge capacity was 169 mAh/g, the 4.5V high rate average electric potential was 3.96 V. Further, the heat generation starting temperature was 167° C.

Example 4

A surface modified lithium-containing composite oxide was prepared in the same manner as in Example 1 except that the heat treatment temperature of the lithium source-titanium source-aluminum source-impregnated particles was changed from 700° C. to 600° C. Of the obtained surface modified lithium-containing composite oxide, the average particle size D50 was 14.3 μm, D10 was 8.6 μm, D90 was 22.1 μm, and the specific surface area was 0.39 $m^2$/g obtained by the BET method. Further, the amount of the lithium titanium composite oxide contained in the surface layer was 1 mol % based on the lithium-containing composite oxide as the base material, the amount of remaining alkali in the obtained powder of the surface modified lithium-containing composite oxide was 0.01% by weight, and the press density was 2.93 g/$cm^3$.

With respect to the powder of the surface modified lithium-containing composite oxide, powder X-ray diffraction measurement was carried out in the same manner as in Example 1, and from the obtained X-ray diffraction spectrum, presence of a compound having peaks at 2θ=43.8±0.5° and 63.1±0.5° in addition to peaks derived from the lithium-containing composite oxide as the base material was confirmed. Further, as a result of analysis of the X-ray diffraction spectrum, the lithium titanium composite oxide was confirmed to have a cubic crystal structure. Further, it was confirmed that the space group of the crystals substantially agree with the X-ray diffraction spectrum of a compound having the same cubic system and having space group Fm-3m. Further, the half value width of the diffraction peak of (110) plane at 2θ=66.5±1° was 0.108°.

With respect to the surface modified lithium-containing composite oxide, electrodes and batteries were prepared and evaluated in the same manner as in Example 1. As a result, the 4.5 V initial discharge capacity was 182 mAh/g, the 4.5 V initial charge and discharge efficiency was 92.6%, the 4.5 V initial average electric potential was 4.01 V, the 4.5 V capacity retention was 96.1%, and the 4.5 V average electric potential was 3.95 V.

Further, the 4.5V high rate discharge capacity was 170 mAh/g, the 4.5V high rate average electric potential was 3.94 V. Further, the heat generation starting temperature was 168° C.

Example 5

A surface modified lithium-containing composite oxide was prepared in the same manner as in Example 1 except that the heat treatment temperature of the lithium source-titanium source-aluminum source-impregnated particles was changed from 700° C. to 800° C. Of the obtained surface modified lithium-containing composite oxide, the average particle size D50 was 16.2 μm, D10 was 9.2 μm, D90 was 26.8 μm, and the specific surface area was 0.24 $m^2$/g obtained by the BET method. Further, the amount of the lithium titanium composite oxide contained in the surface layer was 1 mol % based on the lithium-containing composite oxide as the base material, the amount of remaining alkali in the obtained powder of the surface modified lithium-containing composite oxide was 0.01% by weight, and the press density was 2.98 g/$cm^3$.

With respect to the powder of the surface modified lithium-containing composite oxide, powder X-ray diffraction measurement was carried out in the same manner as in Example 1, and from the obtained X-ray diffraction spectrum, presence of a compound having peaks at 2θ=43.8±0.5° and 63.1±0.5° in addition to peaks derived from the lithium-containing composite oxide as the base material was confirmed. Further, as a result of analysis of the X-ray diffraction spectrum, the lithium titanium composite oxide was confirmed to have a cubic crystal structure. Further, it was confirmed that the space group of the crystals substantially agree with the X-ray diffraction spectrum of a compound having the same cubic system and having space group Fm-3m. Further, the half value width of the diffraction peak of (110) plane at 2θ=66.5±1° was 0.110°.

With respect to the surface modified lithium-containing composite oxide, electrodes and batteries were prepared and evaluated in the same manner as in Example 1. As a result, the 4.5 V initial discharge capacity was 181 mAh/g, the 4.5 V initial charge and discharge efficiency was 92.9%, the 4.5 V initial average electric potential was 4.02 V, the 4.5 V capacity retention was 96.1%, and the 4.5 V average electric potential was 3.99 V.

Further, the 4.5V high rate discharge capacity was 172 mAh/g, the 4.5V high rate average electric potential was 3.95 V. Further, the heat generation starting temperature was 171° C.

Example 6

A surface modified lithium-containing composite oxide was prepared in the same manner as in Example 1 except that as the coating solution, a coating solution obtained by dissolving 10.79 g of a titanium lactate aqueous solution having a Ti content of 8.20% by weight, 0.76 g of lithium carbonate having a lithium content of 18.7% by weight and 1.23 g of a basic aluminum lactate aqueous solution having an Al content of 4.52% by weight dissolved in 57.23 g of water, containing lithium, titanium and aluminum in an atomic ratio of Li:Ti:Al=1:0.9:0.1, was used. The pH of the coating solution was 4.3.

Of the obtained surface modified lithium-containing composite oxide, the average particle size D50 was 12.9 μm, D10 was 7.5 μm, D90 was 20.9 μm, and the specific surface area was 0.28 $m^2$/g obtained by the BET method. Further, the amount of the lithium titanium composite oxide contained in the surface layer was 1 mol % based on the lithium-containing composite oxide as the base material, the amount of remaining alkali in the obtained powder of the surface modified lithium-containing composite oxide was 0.01% by weight, and the press density was 2.95 g/$cm^3$.

With respect to the powder of the surface modified lithium-containing composite oxide, powder X-ray diffraction measurement was carried out in the same manner as in Example 1, and from the obtained X-ray diffraction spectrum, presence of a compound having peaks at 2θ=43.8±0.5° and 63.1±0.5° in addition to peaks derived from the lithium-containing composite oxide as the base material was confirmed. Further, as a result of analysis of the X-ray diffraction spectrum, the lithium titanium composite oxide was confirmed to have a cubic crystal structure. Further, it was confirmed that the space group of the crystals substantially agree with the X-ray diffraction spectrum of a compound having the same cubic system and having space group Fm-3m. Further, the half value width of the diffraction peak of (110) plane at 2θ=66.5±1° was 0.102°.

With respect to the surface modified lithium-containing composite oxide, electrodes and batteries were prepared and evaluated in the same manner as in Example 1. As a result, the 4.5 V initial discharge capacity was 182 mAh/g, the 4.5 V initial charge and discharge efficiency was 92.4%, the 4.5 V initial average electric potential was 4.03 V, the 4.5 V capacity retention was 96.2%, and the 4.5 V average electric potential was 3.96 V.

Further, the 4.5V high rate discharge capacity was 172 mAh/g, the 4.5V high rate average electric potential was 3.94 V. Further, the heat generation starting temperature was 176° C.

Example 7

A surface modified lithium-containing composite oxide was prepared in the same manner as in Example 1 except that as the coating solution, a coating solution obtained by dissolving 9.59 g of a titanium lactate aqueous solution having a Ti content of 8.20% by weight, 0.76 g of lithium carbonate having a lithium content of 18.7% by weight and 2.45 g of a basic aluminum lactate aqueous solution having an Al content of 4.52% by weight in 57.20 g of water, containing lithium, titanium and aluminum in an atomic ratio of Li:Ti:Al=1:0.8:0.2, was used. The pH of the coating solution was 4.6.

Of the obtained surface modified lithium-containing composite oxide, the average particle size D50 was 13.2 μm, D10 was 7.9 μm, D90 was 20.6 μm, and the specific surface area was 0.31 m$^2$/g obtained by the BET method. Further, the amount of the lithium titanium composite oxide contained in the surface layer was 1 mol % based on the lithium-containing composite oxide as the base material, the amount of remaining alkali in the obtained powder of the surface modified lithium-containing composite oxide was 0.01% by weight, and the press density was 2.97 g/cm$^3$.

With respect to the powder of the surface modified lithium-containing composite oxide, powder X-ray diffraction measurement was carried out in the same manner as in Example 1, and from the obtained X-ray diffraction spectrum, presence of a compound having peaks at 2θ=43.8±0.5° and 63.1±0.5° in addition to peaks derived from the lithium-containing composite oxide as the base material was confirmed. Further, as a result of analysis of the X-ray diffraction spectrum, the lithium titanium composite oxide was confirmed to have a cubic crystal structure. Further, it was confirmed that the space group of the crystals substantially agree with the X-ray diffraction spectrum of a compound having the same cubic system and having space group Fm-3m. Further, the half value width of the diffraction peak of (110) plane at 2θ=66.5±1° was 0.106°.

With respect to the surface modified lithium-containing composite oxide, electrodes and batteries were prepared and evaluated in the same manner as in Example 1. As a result, the 4.5 V initial discharge capacity was 183 mAh/g, the 4.5 V initial charge and discharge efficiency was 92.5%, the 4.5 V initial average electric potential was 4.02 V, the 4.5 V capacity retention was 94.0%, and the 4.5 V average electric potential was 3.95 V.

Further, the 4.5V high rate discharge capacity was 173 mAh/g, the 4.5V high rate average electric potential was 3.93 V. Further, the heat generation starting temperature was 169° C.

Example 8

A surface modified lithium-containing composite oxide was prepared in the same manner as in Example 1 except that as the coating solution, a coating solution obtained by dissolving 5.99 g of a titanium lactate aqueous solution having a Ti content of 8.20% by weight, 0.76 g of lithium carbonate having a lithium content of 18.7% by weight and 6.13 g of a basic aluminum lactate aqueous solution having an Al content of 4.52% by weight in 57.12 g of water, containing lithium, titanium and aluminum in an atomic ratio of Li:Ti:Al=1:0.5:0.5, was used. The pH of the coating solution was 6.5.

Of the obtained surface modified lithium-containing composite oxide, the average particle size D50 was 12.4 μm, D10 was 7.1 μm, D90 was 19.8 μm, and the specific surface area was 0.31 m$^2$/g obtained by the BET method. Further, the amount of the lithium titanium composite oxide contained in the surface layer was 1 mol % based on the lithium-containing composite oxide as the base material, the amount of remaining alkali in the obtained powder of the surface modified lithium-containing composite oxide was 0.01% by weight, and the press density was 2.96 g/cm$^3$.

With respect to the powder of the surface modified lithium-containing composite oxide, powder X-ray diffraction measurement was carried out in the same manner as in Example 1, and from the obtained X-ray diffraction spectrum, presence of a compound having peaks at 2θ=43.8±0.5° and 63.1±0.5° in addition to peaks derived from the lithium-containing composite oxide as the base material was confirmed. Further, as a result of analysis of the X-ray diffraction spectrum, the lithium titanium composite oxide was confirmed to have a cubic crystal structure. Further, it was confirmed that the space group of the crystals substantially agree with the X-ray diffraction spectrum of a compound having the same cubic system and having space group Fm-3m. Further, the half value width of the diffraction peak of (110) plane at 2θ=66.5±1° was 0.109°.

With respect to the surface modified lithium-containing composite oxide, electrodes and batteries were prepared and evaluated in the same manner as in Example 1. As a result, the 4.5 V initial discharge capacity was 182 mAh/g, the 4.5 V initial charge and discharge efficiency was 92.5%, the 4.5 V initial average electric potential was 4.02 V, the 4.5 V capacity retention was 93.6%, and the 4.5 V average electric potential was 3.88 V.

Further, the 4.5V high rate discharge capacity was 170 mAh/g, the 4.5V high rate average electric potential was 3.93 V. Further, the heat generation starting temperature was 177° C.

Example 9

A surface modified lithium-containing composite oxide was prepared in the same manner as in Example 1 except that as the coating solution, a coating solution obtained by dissolving 9.59 g of a titanium lactate aqueous solution having a Ti content of 8.20% by weight, 0.49 g of lithium carbonate having a lithium content of 18.7% by weight and 2.45 g of a basic aluminum lactate aqueous solution having an Al content of 4.52% by weight in 57.47 g of water, containing lithium, titanium and aluminum in an atomic ratio of Li:Ti:Al=0.64:0.8:0.2, was used. The pH of the coating solution was 3.8.

Of the obtained surface modified lithium-containing composite oxide, the average particle size D50 was 13.8 µm, D10 was 8.3 µm, D90 was 21.7 µm, and the specific surface area was 0.30 m²/g obtained by the BET method. Further, the amount of the lithium titanium composite oxide contained in the surface layer was 1 mol % based on the lithium-containing composite oxide as the base material, the amount of remaining alkali in the obtained powder of the surface modified lithium-containing composite oxide was 0.01% by weight, and the press density was 2.96 g/cm³.

With respect to the powder of the surface modified lithium-containing composite oxide, powder X-ray diffraction measurement was carried out in the same manner as in Example 1, and from the obtained X-ray diffraction spectrum, presence of a compound having peaks at 2θ=43.8±0.5° and 63.1±0.5° in addition to peaks derived from the lithium-containing composite oxide as the base material was confirmed. Further, as a result of analysis of the X-ray diffraction spectrum, the lithium titanium composite oxide was confirmed to have a cubic crystal structure. Further, it was confirmed that the space group of the crystals substantially agree with the X-ray diffraction spectrum of a compound having the same cubic system and having space group Fm-3m. Further, the half value width of the diffraction peak of (110) plane at 2θ=66.5±1° was 0.114°.

With respect to the surface modified lithium-containing composite oxide, electrodes and batteries were prepared and evaluated in the same manner as in Example 1. As a result, the 4.5 V initial discharge capacity was 186 mAh/g, the 4.5 V initial charge and discharge efficiency was 94.2%, the 4.5 V initial average electric potential was 4.02 V, the 4.5 V capacity retention was 94.7%, and the 4.5 V average electric potential was 3.94 V.

Further, the 4.5V high rate discharge capacity was 171 mAh/g, the 4.5V high rate average electric potential was 3.93 V. Further, the heat generation starting temperature was 158° C.

Example 10

A surface modified lithium-containing composite oxide was prepared in the same manner as in Example 1 except that as the coating solution, a coating solution obtained by dissolving 9.59 g of a titanium lactate aqueous solution having a Ti content of 8.20% by weight, 0.85 g of lithium carbonate having a lithium content of 18.7% by weight and 2.45 g of a basic aluminum lactate aqueous solution having an Al content of 4.52% by weight in 57.11 g of water, containing lithium, titanium and aluminum in an atomic ratio of Li:Ti:Al=1.1: 0.8:0.2, was used. The pH of the coating solution was 5.2.

Of the obtained surface modified lithium-containing composite oxide, the average particle size D50 was 12.8 µm, D10 was 7.5 µm, D90 was 20.4 µm, and the specific surface area was 0.27 m²/g obtained by the BET method. Further, the amount of the lithium titanium composite oxide contained in the surface layer was 1 mol % based on the lithium-containing composite oxide as the base material, the amount of remaining alkali in the obtained powder of the surface modified lithium-containing composite oxide was 0.01% by weight, and the press density was 2.98 g/cm³.

With respect to the powder of the surface modified lithium-containing composite oxide, powder X-ray diffraction measurement was carried out in the same manner as in Example 1, and from the obtained X-ray diffraction spectrum, presence of a compound having peaks at 2θ=43.8±0.5° and 63.1±0.5° in addition to peaks derived from the lithium-containing composite oxide as the base material was confirmed. Further, as a result of analysis of the X-ray diffraction spectrum, the lithium titanium composite oxide was confirmed to have a cubic crystal structure. Further, it was confirmed that the space group of the crystals substantially agree with the X-ray diffraction spectrum of a compound having the same cubic system and having space group Fm-3m. Further, the half value width of the diffraction peak of (110) plane at 2θ=66.5±1° was 0.114°.

With respect to the surface modified lithium-containing composite oxide, electrodes and batteries were prepared and evaluated in the same manner as in Example 1. As a result, the 4.5 V initial discharge capacity was 183 mAh/g, the 4.5 V initial charge and discharge efficiency was 92.3%, the 4.5 V initial average electric potential was 4.03 V, the 4.5 V capacity retention was 90.8%, and the 4.5 V average electric potential was 3.89 V.

Further, the 4.5V high rate discharge capacity was 170 mAh/g, the 4.5V high rate average electric potential was 3.95 V. Further, the heat generation starting temperature was 158° C.

Example 11

A surface modified lithium-containing composite oxide was prepared in the same manner as in Example 1 except that as the coating solution, a coating solution obtained by dissolving 9.59 g of a titanium lactate aqueous solution having a Ti content of 8.20% by weight, 1.22 g of lithium carbonate having a lithium content of 18.7% by weight and 2.45 g of a basic aluminum lactate aqueous solution having an Al content of 4.52% by weight in 56.75 g of water, containing lithium, titanium and aluminum in an atomic ratio of Li:Ti:Al=1.6: 0.8:0.2, was used. The pH of the coating solution was 6.8.

Of the obtained surface modified lithium-containing composite oxide, the average particle size D50 was 12.4 µm, D10 was 7.3 µm, D90 was 19.2 µm, and the specific surface area was 0.26 m²/g obtained by the BET method. Further, the amount of the lithium titanium composite oxide contained in the surface layer was 1 mol % based on the lithium-containing composite oxide as the base material, the amount of remaining alkali in the obtained powder of the surface modified lithium-containing composite oxide was 0.02% by weight, and the press density was 2.98 g/cm³.

With respect to the powder of the surface modified lithium-containing composite oxide, powder X-ray diffraction measurement was carried out in the same manner as in Example 1, and from the obtained X-ray diffraction spectrum, presence of a compound having peaks at 2θ=43.8±0.5° and 63.1±0.5° in addition to peaks derived from the lithium-containing composite oxide as the base material was confirmed. Further, as a result of analysis of the X-ray diffraction spectrum, the lithium titanium composite oxide was confirmed to have a cubic crystal structure. Further, it was confirmed that the space group of the crystals substantially agree with the X-ray diffraction spectrum of a compound having the same cubic system and having space group Fm-3m. Further, the half value width of the diffraction peak of (110) plane at 2θ=66.5±1° was 0.113°.

With respect to the surface modified lithium-containing composite oxide, electrodes and batteries were prepared and evaluated in the same manner as in Example 1. As a result, the 4.5 V initial discharge capacity was 181 mAh/g, the 4.5 V initial charge and discharge efficiency was 91.8%, the 4.5 V initial average electric potential was 4.03 V, the 4.5 V capacity retention was 88.1%, and the 4.5 V average electric potential was 3.87 V.

Further, the 4.5V high rate discharge capacity was 170 mAh/g, the 4.5V high rate average electric potential was 3.96 V. Further, the heat generation starting temperature was 170° C.

Example 12

A surface modified lithium-containing composite oxide was prepared in the same manner as in Example 1 except that as the coating solution, a coating solution obtained by dissolving 14.38 g of a titanium lactate aqueous solution having a Ti content of 8.20% by weight, 0.82 g of lithium carbonate having a lithium content of 18.7% by weight and 3.68 g of a basic aluminum lactate aqueous solution having an Al content of 4.52% by weight in 51.11 g of water, containing lithium, titanium and aluminum in an atomic ratio of Li:Ti:Al=0.72: 0.8:0.2, was used. The pH of the coating solution was 4.0.

Of the obtained surface modified lithium-containing composite oxide, the average particle size D50 was 15.6 µm, D10 was 9.0 µm, D90 was 25.6 µm, and the specific surface area was 0.27 m$^2$/g obtained by the BET method. Further, the amount of the lithium titanium composite oxide contained in the surface layer was 1.5 mol % based on the lithium-containing composite oxide as the base material, the amount of remaining alkali in the obtained powder of the surface modified lithium-containing composite oxide was 0.01% by weight, and the press density was 2.94 g/cm$^3$.

With respect to the powder of the surface modified lithium-containing composite oxide, powder X-ray diffraction measurement was carried out in the same manner as in Example 1, and from the obtained X-ray diffraction spectrum, presence of a compound having peaks at 2θ=43.8±0.5° and 63.1±0.5° in addition to peaks derived from the lithium-containing composite oxide as the base material was confirmed. Further, as a result of analysis of the X-ray diffraction spectrum, the lithium titanium composite oxide was confirmed to have a cubic crystal structure. Further, it was confirmed that the space group of the crystals substantially agree with the X-ray diffraction spectrum of a compound having the same cubic system and having space group Fm-3m. Further, the half value width of the diffraction peak of (110) plane at 2θ=66.5±1° was 0.101°.

With respect to the surface modified lithium-containing composite oxide, electrodes and batteries were prepared and evaluated in the same manner as in Example 1. As a result, the 4.5 V initial discharge capacity was 182 mAh/g, the 4.5 V initial charge and discharge efficiency was 93.7%, the 4.5 V initial average electric potential was 4.02 V, the 4.5 V capacity retention was 83.7%, and the 4.5 V average electric potential was 3.88 V.

Further, the 4.5V high rate discharge capacity was 174 mAh/g, the 4.5V high rate average electric potential was 3.94 V. Further, the heat generation starting temperature was 166° C.

Comparative Example 1

200 g of a powder of a lithium-containing composite oxide having a composition of $Li_{1.01}(Co_{0.979}Mg_{0.01}Al_{0.01}Zr_{0.001})_{0.99}O_2$ prepared in the same manner as in Example 1 was dispersed in 100 g of water, and 1.76 g of lithium hydroxide having a lithium content of 16.2% by weight was charged. Then, 9.75 g of titanium tetrachloride was charged to obtain a suspension. This suspension was stirred for 30 minutes, subjected to filtration and washed twice with 100 g of water to obtain a slurry. Then, this slurry was dried at 120° C. for 4 hours to obtain lithium titanium-impregnated particles. The obtained powder was fired in the air at 700° C. for 12 hours, followed by crushing to obtain a powder of a surface modified lithium-containing composite oxide having $LiTiO_2$ contained in the surface layer of the particle surface. Of the surface modified lithium-containing composite oxide, the average particle size D50 was 17.6 µm, D10 was 9.4 µm, D90 was 29.0 µm, and the specific surface area was 0.49 m$^2$/g obtained by the BET method. The amount of titanium contained in the surface layer of the surface modified lithium-containing composite oxide was 2 mol % based on the lithium-containing composite oxide as the base material. The amount of remaining alkali in the obtained powder of the surface modified lithium-containing composite oxide was 0.028% by weight.

With respect to the powder of the surface modified lithium-containing composite oxide, powder X-ray diffraction measurement was carried out in the same manner as in Example 1, and from the obtained X-ray diffraction spectrum, presence of a compound having peaks at 2θ=43.8±0.5° and 63.1±0.5° in addition to peaks derived from the lithium-containing composite oxide as the base material was confirmed. Further, as a result of analysis of the X-ray diffraction spectrum, the lithium titanium composite oxide was confirmed to have a cubic crystal structure. Further, it was confirmed that the space group of the crystals substantially agree with the X-ray diffraction spectrum of a compound having the same cubic system and having space group Fm-3m. Further, the half value width of the diffraction peak of (110) plane at 2θ=66.5±1° was 0.120°. The press density of the powder was 2.84 g/cm$^3$.

With respect to the surface modified lithium-containing composite oxide, electrodes and batteries were prepared and evaluated in the same manner as in Example 1. As a result, the 4.5 V initial discharge capacity was 176 mAh/g, the 4.5 V initial charge and discharge efficiency was 90.3%, the 4.5 V initial average electric potential was 3.94 V, the 4.5 V capacity retention was 66.9%, and the 4.5 V average electric potential was 3.73 V.

Further, the 4.5V high rate discharge capacity was 165 mAh/g, the 4.5V high rate average electric potential was 3.93 V. Further, the heat generation starting temperature was 165° C.

Comparative Example 2

A surface modified lithium-containing composite oxide was prepared in the same manner as in Example 1 except that as the coating solution, 23.97 g of a titanium lactate aqueous solution having a Ti content of 8.20% by weight, 1.37 g of lithium carbonate having a lithium content of 18.7% by weight and 6.13 g of a basic aluminum lactate aqueous solution having an Al content of 4.52% by weight in 38.53 g of water, containing lithium, titanium and aluminum in an atomic ratio of Li:Ti:Al=0.72:0.8:0.2 was used. The pH of the coating solution was 3.6.

The obtained surface modified lithium-containing composite oxide was prepared. Of the surface modified lithium-containing composite oxide, the average particle size D50 was 17.3 µm, D10 was 9.2 µm, D90 was 31.8 µm, and the specific surface area was 0.38 m$^2$/g obtained by the BET method. Further, the amount of the lithium titanium composite oxide contained in the surface layer was 2.5 mol % based on the lithium-containing composite oxide as the base material, and the amount of remaining alkali in the obtained powder of the surface modified lithium-containing composite oxide was 0.023% by weight, and the press density was 2.89 g/cm$^3$.

With respect to the powder of the surface modified lithium-containing composite oxide, powder X-ray diffraction measurement was carried out in the same manner as in Example 1, and from the obtained X-ray diffraction spectrum, presence of a compound having peaks at 2θ=43.8±0.5° and 63.1±0.5° in addition to peaks derived from the lithium-containing composite oxide as the base material was confirmed. Further, as a result of analysis of the X-ray diffraction spectrum, the lithium titanium composite oxide was confirmed to have a cubic crystal structure. Further, it was confirmed that the space group of the crystals substantially agree with the X-ray diffraction spectrum of a compound having the same cubic system and having space group Fm-3m. Further, the half value width of the diffraction peak of (110) plane at 2θ=66.5±1° was 0.107°.

With respect to the surface modified lithium-containing composite oxide, electrodes and batteries were prepared and evaluated in the same manner as in Example 1. As a result, the 4.5 V initial discharge capacity was 181 mAh/g, the 4.5 V initial charge and discharge efficiency was 93.9%, the 4.5 V initial average electric potential was 4.03 V, the 4.5 V capacity retention was 77.6%, and the 4.5 V average electric potential was 3.84 V.

Further, the 4.5V high rate discharge capacity was 170 mAh/g, the 4.5V high rate average electric potential was 3.95 V. Further, the heat generation starting temperature was 166° C.

INDUSTRIAL APPLICABILITY

A surface modified lithium-containing composite oxide having excellent discharge capacity, volume capacity density, safety, durability for charge and discharge cycles, and high rate property, obtained by the present invention, is widely useful as a cathode active material for a positive electrode for a lithium ion secondary battery.

The entire disclosure of Japanese Patent Application No. 2009-025405 filed on Feb. 5, 2009 including specification, claims, drawings and summary is incorporated herein by reference in its entirety.

What is claimed is:

1. A surface modified lithium-containing composite oxide, comprising:
a lithium-containing composite oxide particle represented by the formula:

; and a surface layer surrounding the particle, said surface layer comprising a lithium titanium composite oxide comprising lithium, titanium and an element Q,
wherein:
N is at least one element selected from the group consisting of Co, Mn and Ni;
M is at least one element selected from the group consisting of Al, Zn, Sn, an alkaline earth metal element and a transition metal element other than Co, Mn and Ni;
w, x, y, z and a satisfy: $0.9 \leq w \leq 1.3$, $0.9 \leq x \leq 1.0$, $0 \leq y \leq 0.1$, $1.9 \leq z \leq 2.1$, and $0 \leq a \leq 0.05$;
the element Q is at least one selected from the group consisting of B, Al, Sc, Y and In;
a proportion of a total amount of the titanium and the element Q in the lithium titanium composite oxide relative to the lithium-containing composite oxide particles is from 0.01 to 2 mol %;
a powder X-ray diffraction measurement of the lithium titanium composite oxide with CuKα rays exhibits a peak at a diffraction angle 2θ within a range of 43.8±0.5°;
an atomic ratio (lithium/(element Q+titanium)) of the lithium to the total amount of the element Q and the titanium contained in the lithium titanium composite oxide satisfies:

$0.55 \leq$ lithium/(element Q+titanium) $\leq 1.8$;

an atomic ratio (element Q/titanium) of the element Q to the titanium contained in the lithium titanium composite oxide satisfies:

$0.01 \leq$ (element Q/titanium) $\leq 0.5$; and the lithium titanium composite oxide has a crystal structure of space group Fm-3m.

2. The surface modified lithium-containing composite oxide according to claim 1, wherein the atomic ratio (element Q/titanium) of the element Q to the titanium contained in the lithium titanium composite oxide satisfies:

$0.05 \leq$ (element Q/titanium) $\leq 0.25$

3. The surface modified lithium-containing composite oxide according to claim 1, wherein the atomic ratio (lithium/(element Q+titanium)) of the lithium to the total amount of the element Q and the titanium contained in the lithium titanium composite oxide satisfies:

$0.85 \leq$ lithium/(element Q+titanium) $\leq 1.8$.

4. The surface modified lithium-containing composite oxide according to claim 1, wherein M is at least one element selected from the group consisting of Al, Ti, Zr, Hf, Nb, Ta, Mg, Sn and Zn.

5. The surface modified lithium-containing composite oxide according to claim 1, wherein the powder X-ray diffraction measurement of the lithium titanium composite oxide with CuKα rays exhibits a peak at a diffraction angle 2θ within a range of 63.1±0.5°.

6. A positive electrode, comprising:
a cathode active material;
an electroconductive material; and
a binder,
wherein the cathode active material comprises the surface modified lithium-containing composite oxide of claim 1.

7. A lithium ion secondary battery, comprising:
the positive electrode of claim 6;
a negative electrode; and
an electrolytic solution.

8. A process for producing the surface modified lithium-containing composite oxide of claim 1, the process comprising impregnating a powder comprising the lithium-containing composite oxide particle represented by the formula: $Li_wN_xM_yO_zF_a$ with a solution comprising a lithium source, a titanium source and an element Q source to obtain lithium source-titanium source-element Q source-impregnated particles, and heat treating the lithium source-titanium source-element Q source-impregnated particles at from 500 to 1,000° C. to obtain a surface modified lithium-containing composite oxide.

9. The process according to claim 8, wherein the atomic ratio (element Q/titanium) of element Q to titanium contained in the solution satisfies $0.05 \leq$ (element Q/titanium) $\leq 0.25$.

10. The process according to claim 8, wherein an atomic ratio (lithium/(element Q+titanium)) of lithium to the total amount of element Q and titanium contained in the solution satisfies $0.85 \leq$ lithium/(element Q+titanium)$\leq 1.8$.

11. The process according to claim 8, wherein the solution further comprises a carboxylic acid comprising at least 2 carboxy groups, or at least 2 in total of carboxy groups and hydroxy groups or carbonyl groups.

12. The process according to claim 8, wherein the solution has a pH of from 1 to 7.

13. The process according to claim 8, wherein the titanium source is titanium lactate.

14. The process according to claim 8, wherein the element Q comprises boron oxide.

15. The process according to claim 8, wherein the element Q comprises basic aluminum lactate.

16. The process according to claim 8, wherein the element Q comprises indium acetate.

17. The process according to claim 8, wherein the solution is an aqueous solution.

18. The process according to claim 8, wherein the lithium source is lithium carbonate.

19. The process according to claim 8, wherein the powder X-ray diffraction measurement of the lithium titanium composite oxide exhibits a peak at a diffraction angle 2θ within a range of 63.1±0.5°.

* * * * *